United States Patent [19]

McDowell et al.

[11] Patent Number: 4,743,421
[45] Date of Patent: May 10, 1988

[54] METHOD OF MAKING GASKET HAVING ROLLER COATED SECONDARY SEALS

[75] Inventors: Donald J. McDowell, Riverside; Jerry Zabel, Buffalo Grove, both of Ill.

[73] Assignee: Fel-Pro Incorporated, Skokie, Ill.

[21] Appl. No.: 40,033

[22] Filed: Apr. 20, 1987

[51] Int. Cl.$^4$ .............................................. B29C 59/02
[52] U.S. Cl. ................................. 264/129; 264/257; 264/324; 277/207 R; 277/234; 277/235 B; 277/DIG. 6; 427/210; 427/275
[58] Field of Search ...................... 427/210, 275, 264; 277/207 R, 235 B, 233, DIG. 6, 234; 264/129, 324, 257

[56] References Cited

U.S. PATENT DOCUMENTS

| | | | |
|---|---|---|---|
| 2,058,010 | 10/1936 | Fitch | 277/211 |
| 3,053,544 | 9/1962 | Gorsica | 277/180 |
| 3,721,452 | 3/1973 | Black | 277/9 |
| 3,794,333 | 2/1974 | Czernik et al. | 277/180 |
| 4,140,323 | 2/1979 | Jacobs | 277/166 |
| 4,630,835 | 12/1986 | Locacius | 277/235 B |

FOREIGN PATENT DOCUMENTS 819177 10/1951 Fed. Rep. of Germany .
899552 6/1962 United Kingdom .

Primary Examiner—Evan K. Lawrence
Attorney, Agent, or Firm—Dressler, Goldsmith, Shore, Sutker & Milnamow, Ltd.

[57] ABSTRACT

A method of making a gasket is disclosed. Peaks, such as those formed by embossments are formed in a main gasket body, the peaks projecting from a major surface of the gasket body. The projecting peaks are roller coated with a sealant material which is then cured, thereby inexpensively to form an improved gasket.

6 Claims, 1 Drawing Sheet

METHOD OF MAKING GASKET HAVING ROLLER COATED SECONDARY SEALS

BACKGROUND OF THE INVENTION

At present, apertured gaskets are provided with supplemental seals around apertures or in association with such apertures. Such supplemental seals may comprise embossments, such as those shown in Gorsica U.S. Pat. No. 3,053,544. Such embossments are sometimes filled with additional sealant materials, such as shown in U.S. Pat. No. 3,721,452 and German Pat. No. 819,177. Other patents, such as U.S. Pat. No. 4,213,620, show the compression of a gasket body except in localized zones to leave elevated portions for purposes of effecting a seal. Other patents disclose the coating of gasket surfaces, presumably by any type of coating process, see, for example, British Pat. No. 899,552.

Still other supplemental seals are printed patterns, such as annular patterns. Printed patterns are typically provided by the silk-screening of the gasket surface with the desired pattern, as is shown by Hillier U.S. Pat. No. 3,477,867. Filling embossments by a silk-screening process is shown in U.S. Pat. No. 4,140,323. Although silk-screened seals have become very important adjuncts to effective gaskets, the process is a relatively expensive one.

It would be of advantage to utilize supplemental sealing materials or supplemental seals which produce an effective sealing adjunct, but at a substantially lower cost.

SUMMARY OF THE INVENTION

In accordance with the present invention, a method of making an improved gasket is provided. The method comprises the steps of providing a main gasket body defining at least one opening therein and having first and second major sealing surfaces, forming a peak which projects from one major sealing surface, and roller coating said peak with a sealant material and then curing same thereby to provide a sealing bead on said peak.

The step of forming the peak may be by embossing the second major sealing surface to form an embossment comprising the peak or by compressing the gasket to provide the peak. The peak may be an annular pattern. Peaks may be formed which extend from both major sealing surfaces.

Further objects, features and advantages of the present invention will become apparent from the following description and drawings.

DETAILED DESCRIPTION OF THE PREFERRED EMBODIMENT

Figure 1:
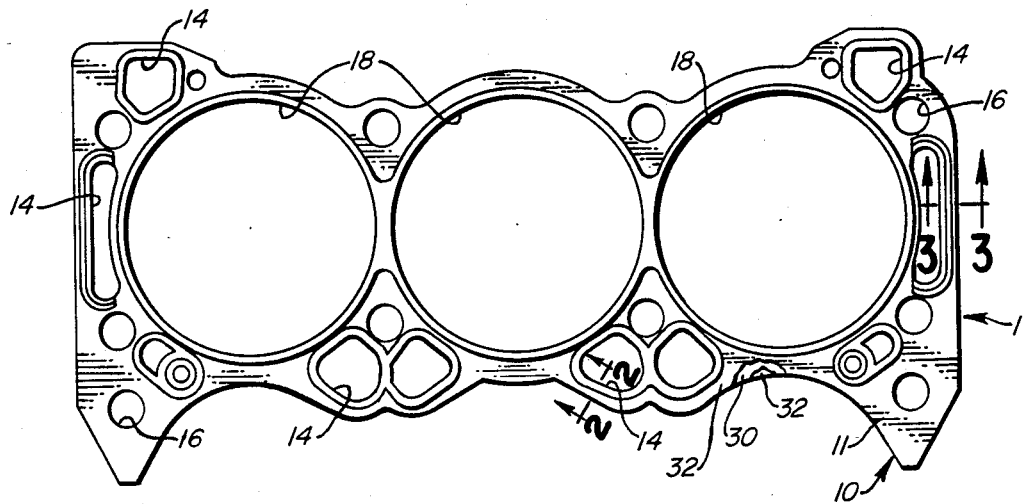
FIG. 1 is a plan view of a gasket assembly embodying the present invention.
Figure 2:
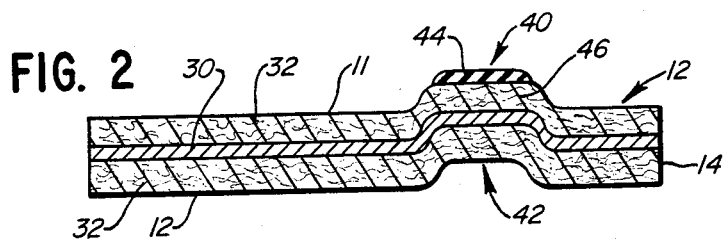
FIG. 2 is an enlarged cross-sectional view taken substantially along line 2—2 of FIG. 1.

Referring first to FIGS. 1 and 2, a gasket 1 employing the present invention is seen to comprise a flat main gasket body 10 having a first major sealing surface 11 and a second major sealing surface 12, water and oil openings 14, and bolt holes 16. Gasket 10 also defines three combustion openings 18 which are generally circular and which are intended for sealing communication with an engine, and in particular with the engine head and block of the engine. Gasket 10 is typically used for one side of a V-6 engine.

Gasket 10 may also include conventional armoring for the combustion openings 18. Armoring comprises three joined generally V-shaped armor sections which respectively sealingly embrace the peripheries of the combustion opening for a well-known purpose.

The main gasket body 10 typically may comprise a laminate, such as of an imperforate metallic core 30, and a pair of facing sheets 32. Facing sheets 32 are a fiber reinforced composite and are laminated to core 30. The most popular and frequently used facings incorporate asbestos or glass fibers and utilize nitrile, neoprene or polyacrylic elastomers to provide the self-sustaining facing sheets. In the embodiment illustrated, the facings may have a thickness of about 0.015 inch, although, of course, this may vary with the application. Facing sheets 32 generally resist degradation by oils and coolants, retain torque, minimize extrusion, and exhibit heat resistance.

The main gasket body 10 is die cut or blanked out, such as with a stamping machine, punch press or other suitable form of equipment to provide the three combustion openings, the bolt holes 16 and the plurality of fluid flow openings, such as oil and water openings 14. A typical gasket assembly body having the configuration shown in FIG. 1 may have a thickness of about 0.040 inch. Other configurations and thicknesses may be used depending upon the configuration and requirements of the engines with which the gasket assembly is to be used.

Referring now to FIG. 2, a secondary seal 40 is provided around at least one of the oil or water openings 14 in the first major sealing surface 11. Seal 40 comprises an embossment 42 which projects from the sealing surface 11, and which is formed in an embossing die in a known manner, and a sealing bead 44 surmounting the projecting peak 46 of the embossment. The sealing bead 44 generally uniformly covers the peak or a portion thereof which is at the highest part of the peak so that it will sealingly engage a surface against which the gasket is placed.

The sealing bead 44 is formed by roller-coating the gasket 1 after it has been fully formed and assembled, and after the embossments 42 have been formed therein. Thus, after the gasket 1 has been otherwise completed, it is positioned at a roller coating station and is moved relative to a roller coater to deposit the layer or bead 44 on the peaks only of all of the embossments which project from one surface of the gasket, and without coating the remaining or other surfaces of the gasket. Thus the sealing loads are concentrated at the peaks and the sealing characteristics of the gasket body is not otherwise changed, as would be the case with the gaskets of German Pat. No. 819,177. Such a coating procedure is rapid and avoids the needs in typical silk screening processes of forming silk screens and of carefully registering the screen and the gasket.

The coating material which may be used to provide the beads 44 may be a high temperature resistant silicone rubber, such as Dow Corning 96-083 two-part silicone elastomer that developes an adhesive bond. When the two-parts are mixed and a curing agent is added, it cures with heat. Other suitable sealing materials which may be used are polyurethane, epoxies, cureable liquid elastomer, various latex formulations.

A typical formulation which may effectively be deposited by roller-coating on the peaks 46 of the embossments 42 is Dow Corning's silicone elastomer 96-083.

Figure 6:
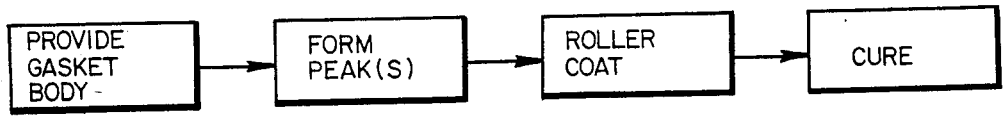
FIG. 6 is a flow diagram of a process of this invention.

Following roller coating, the gasket is cured as by passing it through a suitable curing oven. The overall process is shown by FIG. 6.

Figure 3:
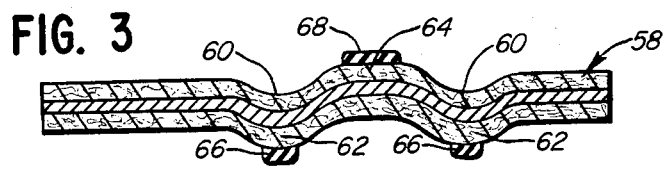
FIG. 3 is an enlarged, cross-section view of a further embodiment of the present invention.

Referring now to the embodiment of FIG. 3, which is a cross-sectional view taken at a location like that of FIG. 2, it is seen that a pair of embossments 60 have been formed in main gasket body 58. In so forming the embossments, it will be seen that a pair of peaks 62 have been provided at one major surface and a peak 64 projecting beyond the suface of the gasket body 58 on the other side has also been formed. Each of the peaks has been provided with a sealing bead 66, 68, thereby to provide a secondary seal assembly at each major surface of the gasket assembly.

In connection with FIG. 3, the beads 66, 68 are again formed by roller coating, in this case by first roller coating the beads onto one major surface of the gasket body 58 and then, after curing those beads, by roller coating the bead or beads on the other major surface In all cases, the high points or peaks on one side will easily be roller coated at those locations only, and thereafter the high points or peaks on the other side will easily be roller coated at the peaks only, all without requiring special equipment or special concern for the registration of a screen or the like with the gasket to be coated.

Of course, as is the custom with gaskets now being made and sold, the secondary seals need not be annular nor completely surround an opening in the gasket. The secondary seals, hence the peak-roller coated embossments, may be parti-annular or may otherwise be suitable segmented sections.

Although laminated gaskets may be embossed, as shown in connection with FIGS. 1–3, it is also possible to provide laminated or other gaskets which have peaks formed other than by embossment.

Figure 4:
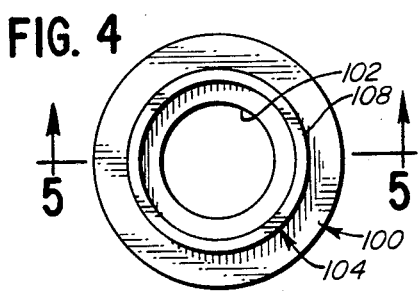
FIG. 4 is a plan view of further gasket assembly embodying the present invention.
Figure 5:
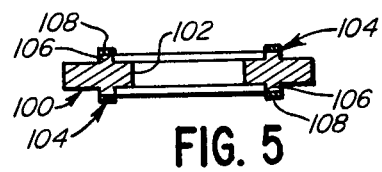
FIG. 5 is a cross-section view taken substantially along line 5—5 of FIG. 4.

For example, as shown by FIGS. 3 and 4, a fibrous gasket 100, such as of facing sheet material or other fibrous material, defining an aperture 102 may define a circumferential secondary seal 104 on one or both major sealing surfaces. In this case, the secondary seals are seen to be projecting peaks 106, each surmounted by a sealing bead 108 which has been deposited by roller coating in the manner described above. In this case the gasket 100 has been embossed, in a manner of speaking, by compressing the compressable gasket material in all zones except in the zone of the peaks, leaving the zone of the peaks less densified, but elevated to provide for cooperation with the roller coater to facilitate deposit and formation of the sealing bead 104.

It will be apparent to those skilled in the art that modifications of the disclosed embodiments may be made without departing from the spirit and scope of the present invention. Accordingly we do not intend the invention to be limited to the embodiments shown or described except as may be made necessary by the appended claims.

What is claimed is:

1. A method of making a gasket comprising the steps of
providing a main gasket body defining at least one opening therein, and having first and second major sealing surfaces,
forming at least one peak which projects from one major sealing surface, and
roller coating only said peak with a sealant material and then curing same thereby to provide a sealing bead on said peak.

2. The method of claim 1, further comprising the steps of forming said peak by embossing the second major sealing surface to form an embossment comprising said peak.

3. The method of claim 2, further comprising the step of forming said peak by compressing said gasket to provide said peak.

4. The method of claim 1, further comprising the step of forming said peak in an annular pattern around said opening.

5. The method of claim 1, further comprising the step of forming another peak which extends from said other major sealing surface and roller coating this peak as well.

6. The method of claim 1, and wherein said sealant is a silicone elastomer.

* * * * *